(12) United States Patent
Tan et al.

(10) Patent No.: US 8,639,300 B2
(45) Date of Patent: Jan. 28, 2014

(54) METHOD AND APPARATUS FOR MAINTAINING TRANSMIT AUDIO IN A HALF DUPLEX SYSTEM

(75) Inventors: Cheah Heng Tan, Bayan Lepas (MY); Thean Hai Ooi, Penang (MY); Kheng Shiang Teh, Penang (MY); Huoy Thyng Yow, Perka (MY)

(73) Assignee: Motorola Solutions, Inc., Schaumburg, IL (US)

( * ) Notice: Subject to any disclaimer, the term of this patent is extended or adjusted under 35 U.S.C. 154(b) by 397 days.

(21) Appl. No.: 12/634,085

(22) Filed: Dec. 9, 2009

(65) Prior Publication Data

US 2011/0136438 A1 Jun. 9, 2011

(51) Int. Cl.
| H04B 17/00 | (2006.01) |
| H04B 7/00 | (2006.01) |
| H04B 1/38 | (2006.01) |
| H04M 1/00 | (2006.01) |
| H04L 12/16 | (2006.01) |
| H04Q 11/00 | (2006.01) |
| H04B 1/56 | (2006.01) |
| H04L 5/14 | (2006.01) |
| H04M 9/00 | (2006.01) |
| G06F 15/16 | (2006.01) |

(52) U.S. Cl.
USPC ............ 455/569.1; 455/67.13; 455/517; 455/563; 370/260; 370/276; 379/388.01; 379/392.01; 709/227

(58) Field of Classification Search
USPC ........... 455/50.1, 63.1, 67.3, 67.13, 114.1, 455/114.2, 135, 221, 222, 277.2, 278.1, 455/283, 284, 296, 310, 501, 563, 570; 375/346; 379/202.01, 388.01; 381/59, 381/71.12, 71.14, 71.4, 83, 96, 309, 380; 704/200, 215, 226, 231, 233, 243, 270
See application file for complete search history.

(56) References Cited

U.S. PATENT DOCUMENTS

| 4,737,976 | A | * | 4/1988 | Borth et al. ................... 455/563 |
| 5,907,538 | A | * | 5/1999 | White ........................... 370/276 |
| 6,434,110 | B1 | * | 8/2002 | Hemkumar .................. 370/201 |
| 7,054,436 | B2 | * | 5/2006 | Stenmark ................ 379/388.01 |
| 7,689,233 | B2 | * | 3/2010 | Cao et al. ...................... 455/462 |
| 2003/0118201 | A1 | * | 6/2003 | Leske et al. ................... 381/117 |
| 2006/0023870 | A1 | | 2/2006 | Stenmark |
| 2007/0019571 | A1 | * | 1/2007 | Stogel .......................... 370/260 |
| 2007/0218958 | A1 | * | 9/2007 | Emery et al. ............... 455/569.1 |
| 2007/0233471 | A1 | * | 10/2007 | Ariu ............................. 704/215 |
| 2008/0019539 | A1 | * | 1/2008 | Patel et al. ...................... 381/96 |
| 2009/0215439 | A1 | * | 8/2009 | Hamilton et al. ............ 455/418 |
| 2010/0041427 | A1 | * | 2/2010 | Hannu et al. ................. 455/522 |

FOREIGN PATENT DOCUMENTS

GB 666868 2/1952

* cited by examiner

*Primary Examiner* — Ping Hsieh
*Assistant Examiner* — Paul P Tran
(74) *Attorney, Agent, or Firm* — Barbara R. Doutre; Daniel R. Bestor

(57) ABSTRACT

A method for maintaining transmit audio quality under harsh environmental conditions, the method includes receiving audio signals into a microphone of a portable communication device and determining at least one parameter associated with the received audio signals. In accordance with an embodiment, the at least one parameter is compared with a received audio parameter threshold. When the at least one parameter falls outside of the received audio parameter threshold, the audio routing is switched from the microphone to the loudspeaker. Subsequent communication may revert back to the microphone or remain at the loudspeaker depending on monitored audio conditions.

19 Claims, 5 Drawing Sheets

METHOD AND APPARATUS FOR MAINTAINING TRANSMIT AUDIO IN A HALF DUPLEX SYSTEM

FIELD OF THE DISCLOSURE

The present disclosure relates generally to half duplex communication devices and more particularly to maintaining transmit audio quality under harsh environmental conditions.

BACKGROUND

In a half duplex communication system only one party can talk at a time. When one party speaks the other party listens. A half duplex communication device includes a microphone and a loudspeaker. Typically, a push-to-talk (PTT) button on the half duplex communication device is pressed and held down as a first party speaks into the microphone. When the first party releases the PTT button, a second party can respond by pressing their own PTT button and speaking into the microphone. The first party receives and hears the audio at the loudspeaker. In windy and dusty environments, the microphone port can be blocked with dust particles. If the microphone of the communication device is partially or completely blocked or damaged poor audio quality may result.

One approach for improving voice quality is to install multiple microphones within the half duplex communication device. With this approach, when one of the microphones is damaged the other can receive audio signals from the user of the half duplex communication device. However, the use of multiple microphones increases the cost of the communication device.

Therefore, there is a need for a method, apparatus, and system for maintaining transmit audio quality under harsh environmental conditions.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
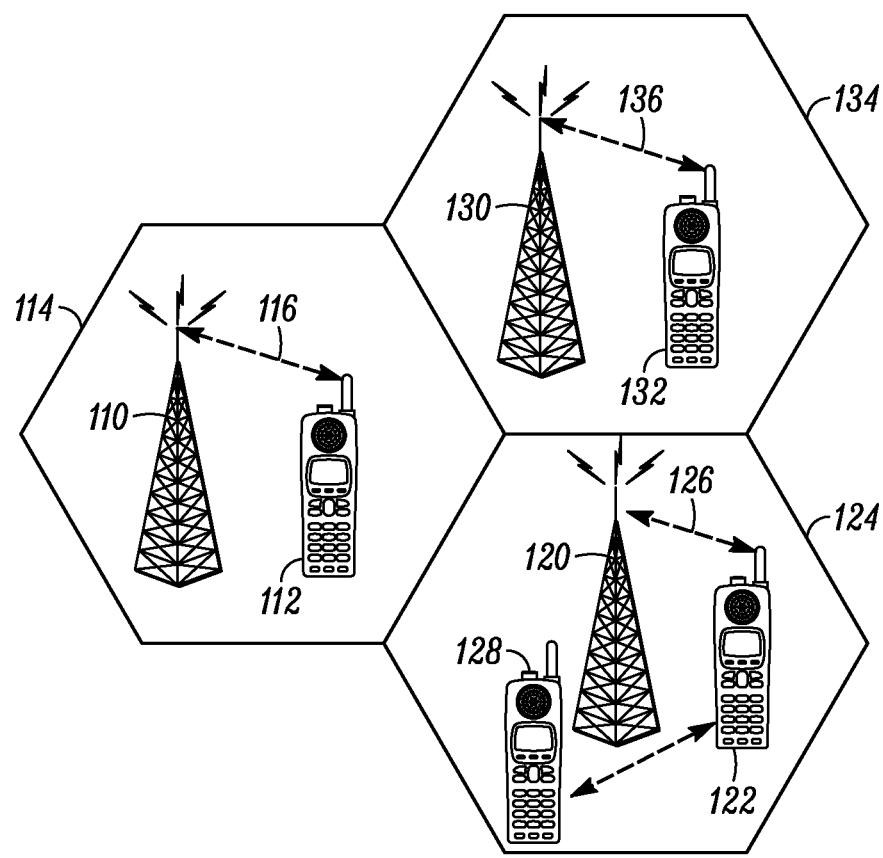
FIG. 1 is a system diagram of a half duplex communication system in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly there is described herein, a method for maintaining transmit audio quality under harsh environmental conditions, the method includes receiving audio signals into a microphone of a portable communication device and determining at least one parameter associated with the received audio signals. In accordance with an embodiment, the at least one parameter is compared with a received audio parameter threshold. When the at least one parameter falls outside of the received audio parameter threshold, the audio routing is switched from the microphone to the loudspeaker. Subsequent communication may revert back to the microphone or remain at the loudspeaker depending on monitored audio conditions.

As used herein, a "half duplex communication system" is a communication system that allows a communication device to either receive or transmit at a single instance. As such, only one party may speak at a time. Referring to FIG. 1, a communication system 100 operating in accordance with an embodiment is shown. Communication system 100 is depicted in a generalized manner to include three wireless coverage areas 114, 124, and 134 for ease of illustration. The wireless coverage area 114 comprises half duplex communication device 112 and an infrastructure device 110 such as towers, base stations, repeaters, or the like. Similarly, wireless coverage area 124 and 134 include half duplex communication devices 122, 132 and infrastructure devices 120, 130 respectively. Even though wireless communication devices are illustrated herein, the invention is equally applicable to wired or fixed communication devices.

The half duplex wireless communication devices are equipped with transceivers, memories, and processing devices operatively coupled and adapted, arranged, configured and designed to carry out their functionality, including any functionality needed to implement the teachings herein. The half duplex wireless communication devices are further equipped with any other elements needed for a commercial embodiment. In addition, the half duplex wireless communication such as 126, 128 can also communicate in talk around mode i.e. without an infrastructure device 110.

As referred to herein, a wireless communication device includes, but is not limited to, devices commonly referred to as access terminals, mobile radios, mobile stations, subscriber units, user equipment, mobile devices, or any other device capable of operating in a half duplex environment. Examples of wireless communication devices include, but are not limited to, two-way radios, mobile phones, Personal Digital Assistants (PDAs), and laptops or any other electronic device capable of conducting a half duplex communication.

Figure 2:
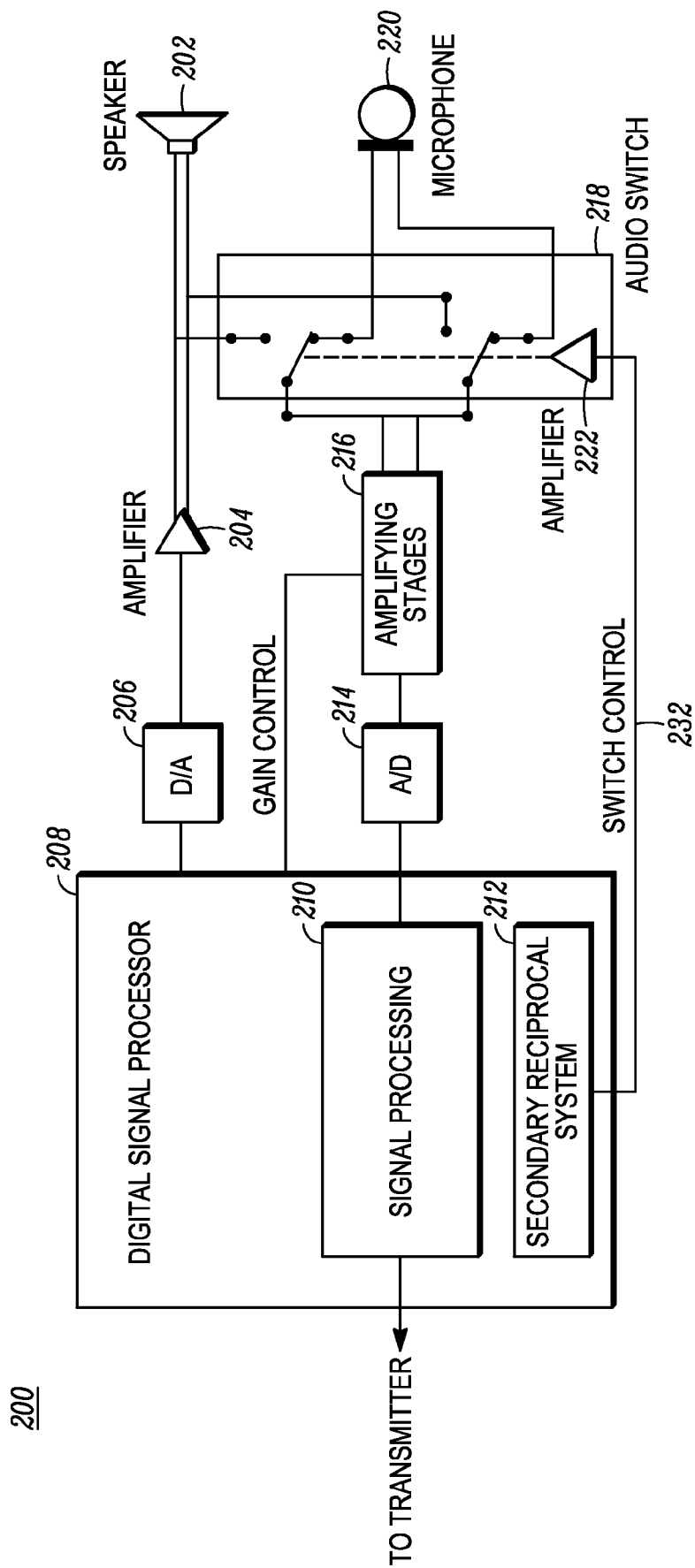
FIG. 2 is a block diagram of a half duplex communication device in accordance an embodiment of the invention.

Turning to FIG. 2, there is provided a block diagram illustrating exemplary components 200 of the half duplex communication devices 112, 122, 132 of FIG. 1. As shown, the components 200 include a loudspeaker 202 for reproducing sound for the user of half duplex communication device 112. The loudspeaker 202 is coupled to digital signal processor 208, via an amplifier 204 and a Digital-to-Analog (D/A) converter 206. The loudspeaker 202 is also coupled to an audio switch 218. The audio switch 218 switches between the loudspeaker 202 and a microphone 220. The audio switch 218 is connected to the digital signal processor 208, via the amplifying stages 216, and an Analog-to-Digital (A/D) converter 214. The amplifying stages 216 are an aggregation of a plurality of amplifiers, to amplify the received audio signals. The A/D converter 214 digitizes the amplified audio signals. After digitization and amplification, the audio signals are further processed by a signal processing circuit 210, wherein the digital signals are passed through an equalizer to flatten frequency response, and through another gain stage. After the digitized audio signals have been processed, the audio signals are sent by the digital signal processor 208 to a transmitter. The digital signal processor 208 also comprises a secondary reciprocal system 212.

The secondary reciprocal system 212 controls the operation of the audio switch 218, via switch control line 232, in accordance with the teaching of the disclosure herein.

Figure 3:
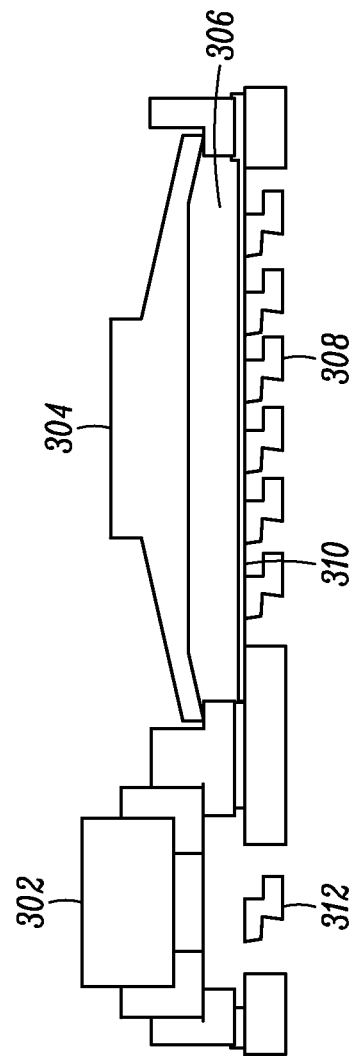
FIG. 3 is a diagram of a loudspeaker microphone assembly in accordance an embodiment of the invention.

FIG. 3 is a diagram of a loudspeaker and microphone assembly in accordance with an embodiment of the invention. As shown in FIG. 3, the loudspeaker and microphone assembly 300 includes a microphone component 302 and a loudspeaker component 304. The microphone component 302 is coupled to an audio port 312 to receive audio signals from the user of the half duplex communication device 112. The loudspeaker component 304 is coupled to a loudspeaker mesh 310 to protect the loudspeaker from dust, and other foreign particles. Coupled to the loudspeaker mesh 310 is a loudspeaker grille 308, that is typically found on the loudspeaker housing (not shown). An air volume 306 is included between the loudspeaker component 304, and the loudspeaker mesh 310. The loudspeaker component 304 is used as a secondary reciprocal transducer in accordance with the teachings of the disclosure herein, and is explained in detail with reference to FIG. 4

Figure 4:
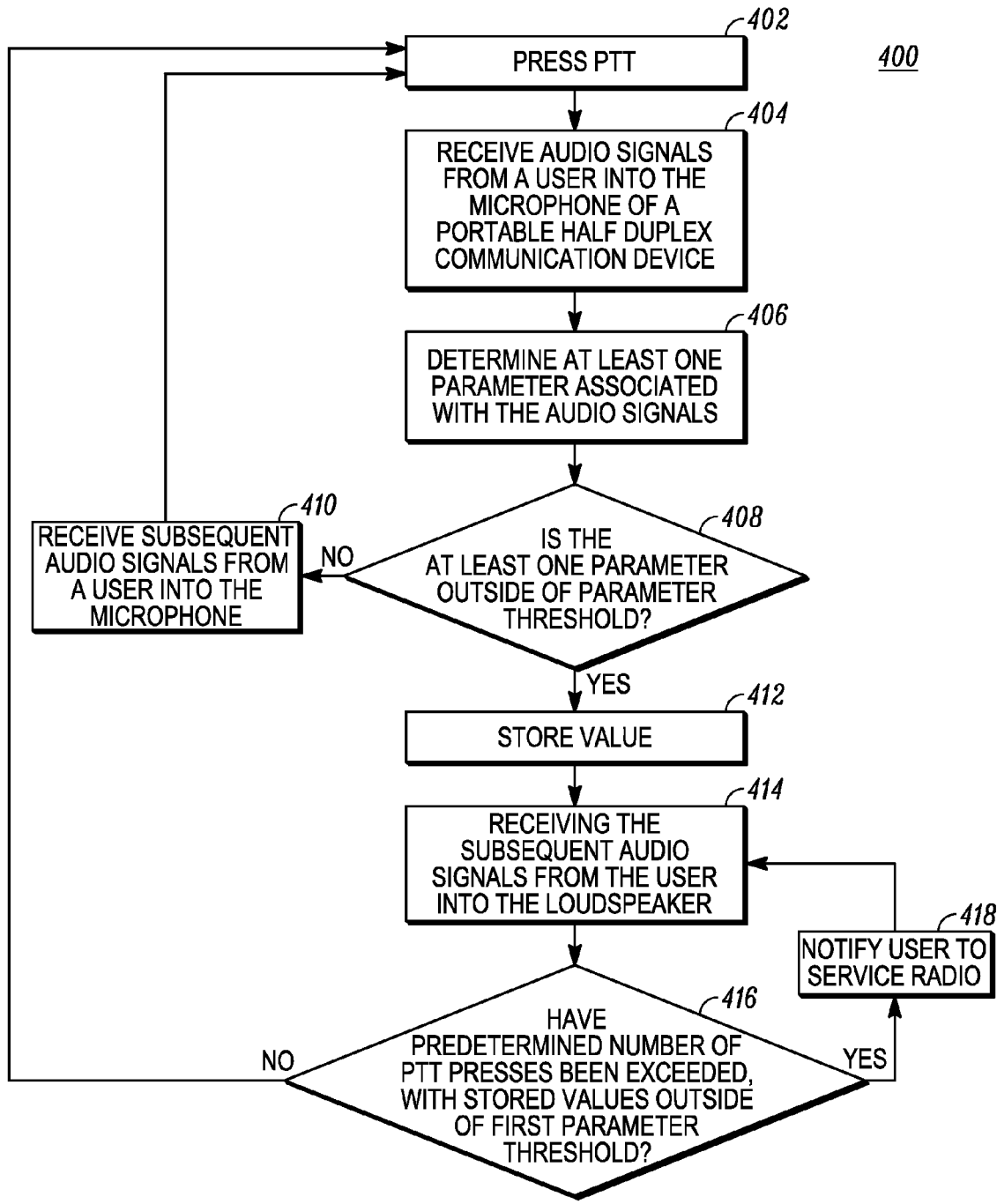
FIG. 4 is a flowchart of a method maintaining transmit audio in a half duplex system, in accordance an embodiment of the invention

FIG. 4 is a flowchart of a method for switching between the microphone 220 and the loudspeaker 202 of the half duplex communication device 122, in accordance with an embodiment of the invention. In accordance with method 400, a user of the half duplex communication device 122 is communicating with another half duplex communication device 128. The user speaks into the microphone 220 of the half duplex communication device 122 to communicate with the remote user, and listens to the remote user's response using the loudspeaker 202.

Each time a user presses a PTT button (402) on his/her half duplex communication device 122, the microphone 220 receives (404) the audio signals from the user of half duplex communication device 122. A secondary reciprocal system 212 determines (406) at least one parameter associated with the audio signals, received via the microphone 220. In one exemplary embodiment, the secondary reciprocal system 212 determines a Signal to Noise Ratio (SNR) parameter and a spectral distribution parameter of the received audio signals. Once the at least one parameter is determined, the secondary reciprocal system 212 determines if the at least one parameter falls outside of an audio parameter threshold (408). In another exemplary embodiment, the secondary reciprocal system 212 compares one or more parameters such as, but not limited to, the Signal to Noise Ratio (SNR) parameter and the spectral distribution parameter of the received audio signals, with their respective threshold.

When the at least one parameter falls inside of the audio parameter threshold, the microphone 220 continues to receive the audio signals from the user (410). When the at least one parameter falls outside of the audio parameter threshold, the secondary reciprocal system 212 stores the determined parameter value(s) of the at least one parameter associated with the audio signals (412). The secondary reciprocal system 212 instructs, via switch control line 232, an audio switch 318 to switch to the loudspeaker 202 to receive (414) the audio signals from the user of the half duplex communication device 122.

While the audio signals are being received via the loudspeaker, a determination is made as to whether a predetermined number of PTT presses, associated with the stored audio parameter values falling outside the audio parameter threshold, exceeds a PTT press threshold (416). When the number of PTT presses associated with the stored values does not exceed the PTT press threshold, the secondary reciprocal system 212 returns to 402.

When the number of PTT presses associated with the stored values exceeds the PTT press threshold, the digital signal processor 208 (DSP) provides the user with a notification that the half duplex communication device 122 needs to be serviced (418). The notification may be a visual or/and audio notification to the user informing the user that the half duplex communication device 112 needs servicing.

In another exemplary embodiment, once audio is received at the loudspeaker (at 414) the secondary reciprocal system 212 may determine whether a pre-determined time period has elapsed. If the predetermined time period has not elapsed, the secondary reciprocal system 212 reverts audio routing back to the microphone 220 to check whether the receive audio signals are back within the audio parameter threshold(s). When the predetermined time has elapsed, the secondary reciprocal system 212 provides the user with the notification that the half duplex communication device 122 needs to be serviced, and continues to receive the audio signals via the loudspeaker 220. This embodiment allows for periodic checks to retry the microphone prior to servicing.

In yet another exemplary embodiment, the secondary reciprocal system 212 may store at least one parameter associated with the audio signals, each time a PTT key is pressed (for example between steps 406 and 408). The secondary reciprocal system 212 determines an average of the stored parameter values and compares the average to the audio parameter threshold(s). After a predetermined time, if the average falls outside the audio threshold(s), the secondary reciprocal system 212 instructs, via the switch control line 232, the audio switch 218 to switch to the loudspeaker 202 to receive the audio signals from the user of the half duplex communication device 122. When the average falls inside of the audio parameter threshold, the microphone 220 continues to receive the audio signals from the user.

Figure 5:
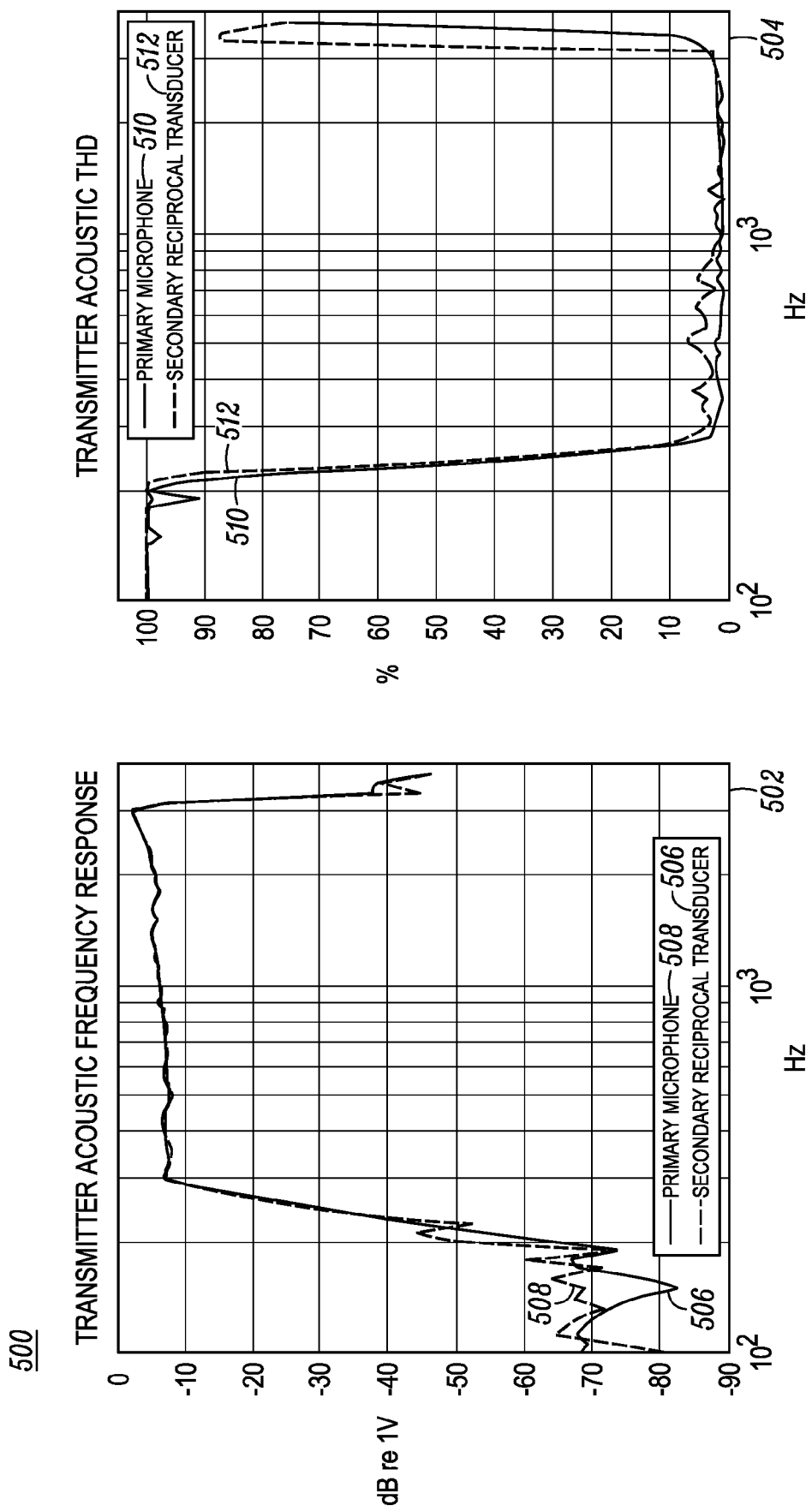
FIG. 5 illustrates an example of data showing a comparison between the performance of the loudspeaker and the microphone in accordance with an embodiment of the invention.

Prototype testing was conducted utilizing a loudspeaker as secondary reciprocal device for a transmit audio system formed in accordance with an embodiment. FIG. 5 illustrates test data 500 that illustrates the acoustic frequency response 502 and acoustic total harmonic distortion 504 of the loudspeaker 202 in comparison with the microphone 220. The acoustic frequency response 502 is a comparison between the voltage output from the microphone 220 and loudspeaker of the half duplex communication device 112. The x-axis of the acoustic frequency response 502 represents frequency in hertz. The y-axis of the acoustic frequency response 502 represents voltage output in dBV. Further, the acoustic total harmonic distortion 504 represents the amount of distortion in the audio signals received from the microphone 220 and loudspeaker. The x-axis of the acoustic total harmonic distortion 504 represents frequency in hertz. The y-axis of the acoustic total harmonic distortion 504 represents distortion in percentage. As seen by the graphs 502, 504 the loudspeaker 202 performs as well as the microphone 220.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling an input audio source of a half duplex communication device, the method comprising the steps of:
   receiving input audio signals directly from a user via a microphone and audio input switch circuit, at a signal processor of a half duplex communication device, for further transmission to another device;
   determining at least one parameter from the input audio signals;
   comparing the at least one parameter with an input audio parameter threshold and determining whether the at least one parameter falls outside the input audio parameter threshold;
   responsive to determining that the at least one parameter falls outside the input audio parameter threshold, switching the audio input switch circuit of the half duplex communication device, from coupling the microphone to an input of a signal processor to coupling a reciprocal transducer loudspeaker to the input of the signal processor, so as to receive subsequent input audio signals directly from the user, via the loudspeaker and audio input switch circuit, for further transmission to the another device; and
   subsequently switching the audio input switch circuit to disconnect the loudspeaker from the input to the signal processor, receiving incoming audio signals from the another device, and causing the incoming audio signals to be routed to the loudspeaker via an output of the processor for playback to the user.

2. The method of claim 1, further comprising:
   receiving the subsequent input audio signals, via the microphone, when the at least one parameter falls inside the input audio parameter threshold.

3. The method of claim 2, further comprising:
   storing a value of the at least one parameter when the at least one parameter falls outside the input audio parameter threshold.

4. The method of claim 3, further comprising:
   determining whether a number of PTT presses, associated with the stored value that fell outside the input audio parameter threshold, exceeds a PTT key press threshold.

5. The method of claim 4, further comprising:
providing a notification, to the user, that the half duplex communication device needs service when the number of PTT presses is above the PTT key press threshold;
receiving the subsequent input audio signals via the loudspeaker; and
transmitting the subsequent input audio signals to the another device.

6. The method of claim 4, further comprising:
receiving the subsequent input audio signals via the microphone when the number of PTT key presses has not exceeded the PTT key press threshold; and
transmitting the subsequent input audio signals to the another device.

7. The method of claim 5, wherein the notification is one of an audio notification and a visual notification.

8. The method of claim 1, wherein determining the at least one parameter from the input audio signals is performed when the user presses a PTT button on the half duplex communication device at a first instant.

9. The method of claim 1, wherein the at least one parameter is at least one of a Signal to Noise Ratio (SNR) and a spectral distribution.

10. The method of claim 3, further comprising:
determining whether a predetermined time period has elapsed since the loudspeaker started receiving subsequent input audio signals directly from the user.

11. The method of claim 10, further comprising:
providing a notification, to the user, that the half duplex communication device needs service, when the predetermined time period has elapsed.

12. A half duplex communication device, comprising:
a microphone;
a reciprocal transducer loudspeaker;
an audio input switch circuit coupled to the microphone and the loudspeaker; and
a signal processor coupled to the audio input switch and configured to:
receive input audio signals directly from a user via the microphone and the audio input switch circuit, for further transmission to another device
determine at least one parameter from the input audio signals received directly from the user, via the microphone, and
compare the at least one parameter to an input audio parameter threshold and determine whether the at least one parameter falls outside the input audio parameter threshold;
responsive to determining that the at least one parameter falls outside the input audio parameter threshold, cause the audio input switch circuit to switch from coupling the microphone to an input of the signal processor to coupling the loudspeaker to the input of the signal processor, so as to receive subsequent input audio signals directly from the user, via the loudspeaker and audio input switch circuit, for further transmission to another device; and
subsequently cause the audio input switch circuit to disconnect the loudspeaker from the input to the signal processor, receive incoming audio signals from the another device, and cause the incoming audio signals to be routed to the loudspeaker via an output of the signal processor for playback to the user.

13. The half duplex communication device of claim 12, wherein:
the microphone receives the subsequent input audio signals directly from the user when the at least one parameter falls inside the input audio parameter threshold.

14. The half duplex communication device of claim 13, wherein the signal processor is further configured to:
store a value of the at least one parameter when the at least one parameter falls outside the input audio parameter threshold; and
determine whether a number of PTT key presses by the user, associated with the stored value that fell outside the input audio parameter threshold, exceeds a PTT key press threshold.

15. The half duplex communication device of claim 14, wherein when the number of PTT key presses, having stored value outside the input audio parameter threshold, has exceeded the PTT key press threshold:
the signal processor providing a notification, to the user, that the half duplex communication device needs service.

16. The half duplex communication device of claim 14, further comprising:
the input audio switch switching back to the microphone for receiving the subsequent input audio signals directly from the user when the number of PTT presses, having stored value outside the input audio parameter threshold, has not exceeded the PTT key press threshold.

17. The half duplex communication device of claim 12, wherein the at least one parameter is at least one of a Signal to Noise Ratio (SNR) and a spectral distribution.

18. The method of claim 1, wherein determining that the at least one parameter falls outside the input audio parameter threshold indicates that the microphone is at least partially blocked or damaged.

19. The half duplex communication device of claim 14, wherein the signal processor is further configured to determine that that the microphone is at least partially blocked or damaged responsive to determining that the at least one parameter falls outside the input audio parameter threshold.

* * * * *